United States Patent
Agopian et al.

(10) Patent No.: US 9,332,101 B1
(45) Date of Patent: *May 3, 2016

(54) CONTACT CROPPING FROM IMAGES

(71) Applicant: Google Inc., Mountain View, CA (US)

(72) Inventors: Mathias Marc Agopian, Mountain View, CA (US); Mark Wagner, Clyde Hill, WA (US); Steven Horowitz, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,713

(22) Filed: Aug. 1, 2014

Related U.S. Application Data

(63) Continuation of application No. 13/940,449, filed on Jul. 12, 2013, now Pat. No. 8,798,335, which is a continuation of application No. 11/938,720, filed on Nov. 12, 2007, now Pat. No. 8,498,451.

(51) Int. Cl.
  *G06K 9/00* (2006.01)
  *H04M 1/2745* (2006.01)
  *G06T 11/60* (2006.01)

(52) U.S. Cl.
  CPC ....... *H04M 1/27455* (2013.01); *G06K 9/00288* (2013.01); *G06T 11/60* (2013.01); *G06T 2200/24* (2013.01); *G06T 2210/22* (2013.01)

(58) Field of Classification Search
  CPC .......... H04M 1/27455; G06K 9/00288; G06T 11/60; G06T 2200/24; G06T 2210/22
  See application file for complete search history.

(56) References Cited

U.S. PATENT DOCUMENTS

| | | | |
|---|---|---|---|
| 7,085,590 B2 | 8/2006 | Kennedy et al. | |
| 7,529,390 B2 | 5/2009 | Zhang et al. | |
| 7,685,530 B2 | 3/2010 | Sherrard et al. | |
| 7,873,356 B2 | 1/2011 | Flynt et al. | |
| 7,949,113 B2 | 5/2011 | Tysowski et al. | |
| 8,363,952 B2 | 1/2013 | Bigioi et al. | |
| 8,498,451 B1 | 7/2013 | Agopian et al. | |
| 8,774,767 B2 * | 7/2014 | Yoo ................... | H04M 1/27455 455/412.1 |
| 8,798,335 B1 * | 8/2014 | Agopian et al. ............. | 382/118 |
| 2004/0239982 A1 | 12/2004 | Gignac | |
| 2006/0126082 A1 | 6/2006 | Choi | |
| 2006/0139371 A1 | 6/2006 | Lavine et al. | |
| 2006/0229063 A1 | 10/2006 | Koch | |
| 2006/0280364 A1 | 12/2006 | Ma et al. | |
| 2006/0290792 A1 | 12/2006 | Nikkanen et al. | |
| 2008/0052945 A1 | 3/2008 | Matas et al. | |
| 2008/0112621 A1 | 5/2008 | Gallagher et al. | |
| 2008/0220750 A1 | 9/2008 | Steinberg et al. | |
| 2009/0006484 A1 | 1/2009 | Wang | |
| 2010/0058193 A1 | 3/2010 | Sherrard et al. | |
| 2010/0162171 A1 | 6/2010 | Felt et al. | |
| 2010/0165119 A1 | 7/2010 | Tang et al. | |
| 2011/0249144 A1 | 10/2011 | Chang | |

* cited by examiner

*Primary Examiner* — Gregory M Desire
(74) *Attorney, Agent, or Firm* — Fish & Richarson P.C.

(57) ABSTRACT

The present disclosure provides methods and systems for storing image data in a mobile device. In some embodiments, the method includes generating an image on the mobile device, identifying automatically at least one person in the image, creating a cropped image of the at least one person and storing the cropped image to memory upon request of a user of the mobile device.

20 Claims, 8 Drawing Sheets

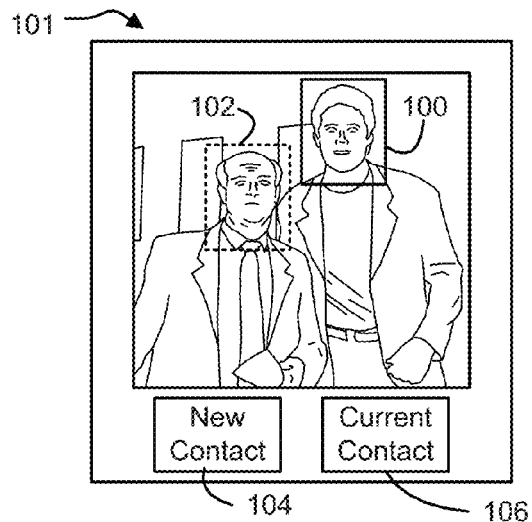
FIG. 1A
FIG. 1B
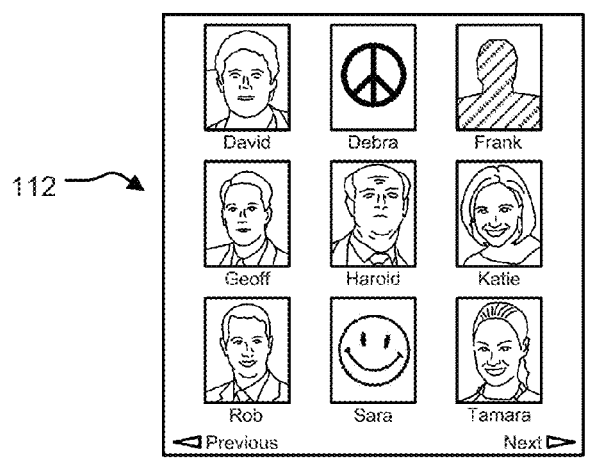
FIG. 1C

CONTACT CROPPING FROM IMAGES

CROSS-REFERENCE TO RELATED APPLICATIONS

This application is a continuation of U.S. patent application Ser. No. 13/940,449, filed Jul. 12, 2013 which is a continuation of U.S. patent application Ser. No. 11/938,720, filed Nov. 12, 2007, the disclosure of which is expressly incorporated herein by reference in its entirety.

TECHNICAL FIELD

This disclosure relates to methods and systems for manipulating digital images, and more particularly to automatic cropping of images.

BACKGROUND

People are social creatures—some more social than others. We express this socialization through relationships, and we carry it out through networking and communication. Networking can be for both social and business purposes. For example, a person may meet an important business connection or potential client at a conference, seminar or other event. Similarly, a person may meet a potential friend or romantic interest during a night out, or at a sporting event, concert, or other social event.

SUMMARY

This document discloses methods, techniques, and systems for storing and managing image data in a mobile device. In some embodiments, the methods includes generating an image on the mobile device, identifying automatically at least one person in the image, creating a cropped image of the person, and storing the cropped image to memory upon request of a user of the mobile device.

In some aspects, the method further includes prompting the user to store the cropped image of the at least one person as a contact. The user may be prompted to select one of a new contact and a previous contact. The contact information may be updated using the cropped image when the user selects a previously stored contact, and new contact information including the cropped image may be stored when the user selects a new contact.

In other aspects, the method further includes generating a crop perimeter that corresponds to the at least one person and enabling the user to adjust dimensions of the crop perimeter to provide an adjusted crop perimeter. The cropped image may be based on one of the crop perimeter and the adjusted crop perimeter.

In another aspect, the method also includes determining automatically whether multiple persons are present in the image, and enabling the user to select a single person when multiple persons are present in the image. The step of creating the cropped image of the at least one person may be based on a selected single person. The method may also include generating crop perimeters corresponding to each of the multiple persons, wherein the step of enabling the user to select a single person includes enabling the user to select one of the crop perimeters to provide a selected crop perimeter. The user may adjust dimensions of the selected crop perimeter to provide an adjusted crop perimeter. The cropped image may be based on one of the selected crop perimeter and the adjusted crop perimeter.

In yet other aspects, the method further includes querying the user whether to store the image to memory, storing the image to memory if the user indicates as such, and purging the image if the user indicates as such.

The details of one or more embodiments are set forth in the accompanying drawings and the description below. Other features, objects, and advantages will be apparent from the description and drawings, and from the claims.

DESCRIPTION OF DRAWINGS

FIG. 1A is a schematic representation of a display of a mobile device in a picture mode.

FIG. 1B is a schematic representation of the display of FIG. 1A, wherein the mobile device is in a contact detail mode.

FIG. 1C is a schematic representation of the display of FIG. 1A, wherein the mobile device is in a contact selection mode.

Like reference symbols in the various drawings indicate like elements.

DETAILED DESCRIPTION

In various embodiments, automatic cropping may enable a person or multiple persons to automatically be identified in an image and to automatically generate a cropped image of an identified person or persons. The cropped image may be stored to a memory and may be associated with a contact. The contact information may in turn be synchronized with a desktop computer. In addition, the image may be used in various manners, such as in a visual index by which a user can pull up contact information about acquaintances or visually dial those acquaintances on the telephone.

Such techniques may provide one or more advantages. For example, a user may readily obtain information for adding a visual element to a user interface. Such an additional visual element may greatly simplify and enhance a user's interaction with a mobile device. In addition, a photograph of an acquaintance may help trigger a user's memory about the acquaintance, such as for a user who meets many different people and cannot always keep their names straight.

One known technique for facial identification is disclosed in commonly assigned U.S. Pat. No. 6,301,370, issued on Oct. 9, 2001, and entitled Face Recognition From Video Images, the disclosure of which is expressly incorporated herein by reference. U.S. Pat. No. 6,301,370 describes a method for detecting and recognizing an object in an image frame such as a head having particular facial characteristics, for example. The object identification and recognition process uses an image processing technique based on model graphs and bunch graphs that efficiently represent image features as jets. The jets are composed of wavelet transforms and are processed at nodes or landmark locations on an image corresponding to readily identifiable features.

Figure 3:
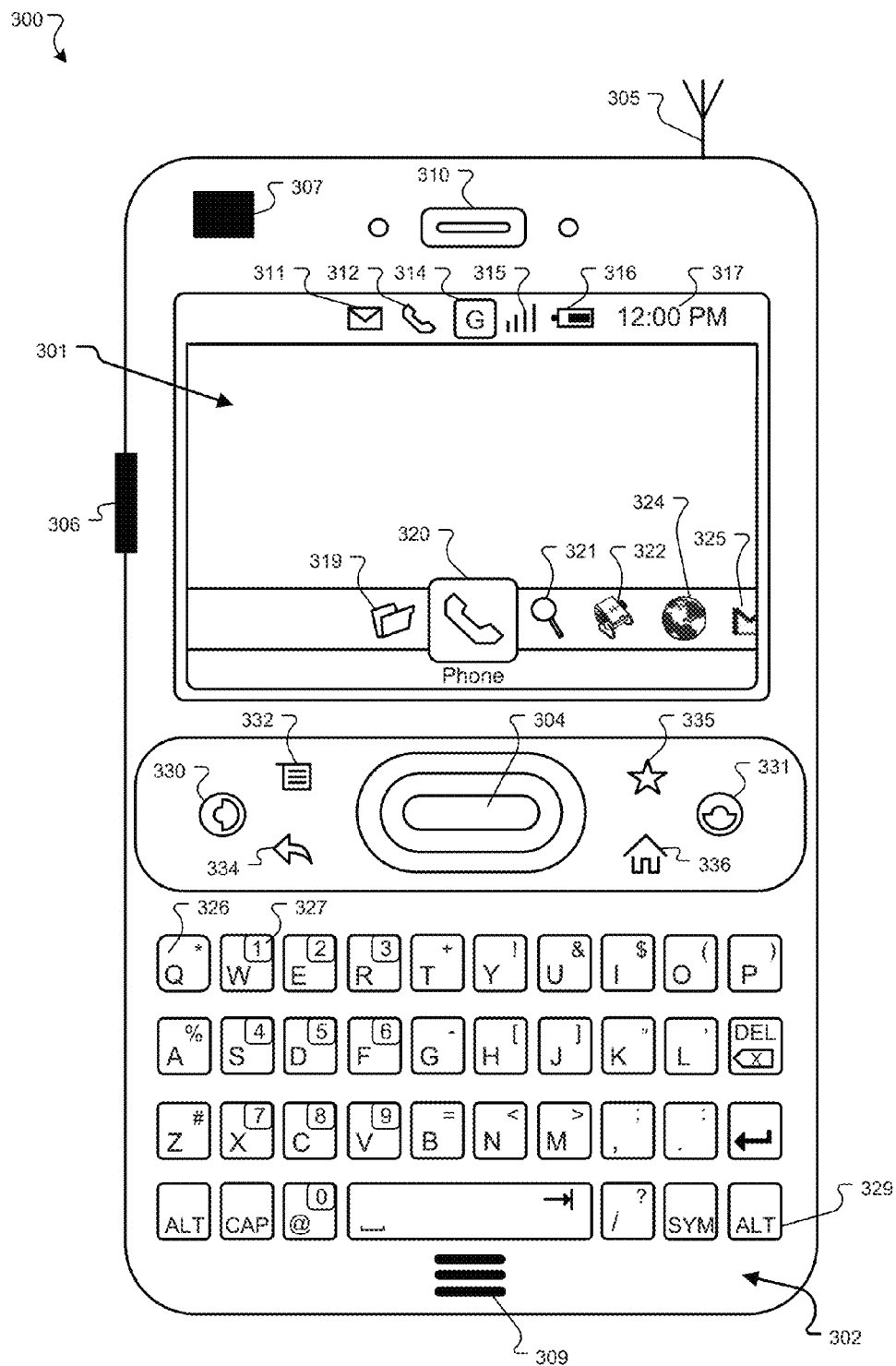
FIG. 3 is a schematic representation of an exemplary mobile device that implements embodiments of the automatic cropping described herein.

FIG. 1A-1C are schematic representations of various graphical user interface (GUI) displays 101, 108, 112 of a mobile device (see, for example, FIG. 3). More specifically, FIG. 1A is a schematic representation of the display 101 of the mobile device in a picture mode. The device may be programmed to identify portions of individuals within a photograph or image that is provided on the mobile device and prompt a user of the device to indicate whether they are interested in performing certain functions relative to the portion, e.g., the face, of the individual. For example, where a face has been identified using various known techniques, the device may determine that a user could be interested in storing information about the person who is shown in the digital image. The digital image can be recorded by the device itself, such as by using a digital camera coupled to the device, or can be transferred to the device from an external source.

In particular, a crop perimeter 100, 102 has been automatically generated for each person in a group of two people identified in the image in display 101, by techniques that can identify a face in an image. The crop perimeters 100, 102 may designate automatically-generated suggested cut lines that permit a portion of the image to be removed so that a selected portion can be seen more clearly (e.g., by later zooming in on the selected portion). Alternatively, the crop perimeters may be manually identified, such as by a user indicating an intent to crop out a portion of a figure, and the user then manipulating the crop perimeter (e.g., by steering it in x and y directions with a 4-direction key and changing its size with a scroll wheel on a mobile device) to select a portion to be cropped from the image. Although the crop perimeters 100, 102 of FIG. 1A are illustrated as rectangles, other shapes can be implemented including, but not limited to, a square, a circle, an ellipse, a triangle, a star, a pentagon, a hexagon, an octagon, and even a user-defined shape. Such cropping thus enables an image (e.g., a still image or a video image) to be taken using the mobile device, and a portion of the acquired image to be used in various manner.

Where multiple people appear in an image, the user may be prompted to select a desired person. This selection can occur by the user scrolling through the identified persons, such as with a 4-direction key or a touch-screen display. In one embodiment, a selected person may be identified by a solid-lined crop perimeter (e.g., crop perimeter 100), while a non-selected person may be identified by a dashed or phantom-lined crop perimeter (e.g., crop perimeter 102), or vice versa. As the user scrolls between persons, the crop perimeters switch between the solid-lined crop perimeter 100 and the phantom-lined crop perimeter 102. For example, in the exemplary image of FIG. 1A, the selected identified person may be indicated by the solid lined crop perimeter 100. Also, different line colors or line weights may be used to indicate which individuals in a picture are currently selected and which are not.

Upon selecting an identified person, the user may adjust the dimensions of the crop perimeter 100, 102. More specifically, the user may adjust the height, width, circumference, and/or any other appropriate dimension. In this manner, the automatically generated crop perimeter 100, 102 may be tailored by the user to encompass as much or as little of the identified person as desired, even if the location of the crop perimeter and its initial size are identified automatically. For example, the automatically generated crop perimeter 100, 102 may be adjusted by the user to encompass the facial area of the identified person. As another example, the automatically generated crop perimeter 100, 102 may be adjusted to encompass the entire body of the identified person or a desired portion of the body of the identified person. In addition, multiple people may be enveloped by the crop perimeter, such as when a user intends to associate the cropped image with an entry associated with a pair of twins.

The area of the image, which is encompassed by the automatically generated crop perimeter or the adjusted crop perimeter, may then be stored as a cropped image. The main image may be discarded or may be separately stored. In addition, the main image may be stored, and the cropped portion may be referenced as a part of the saved main image, so that separate storage of a main image and a cropped image is not required.

The user may be presented with buttons 104, 106 in display 101 to select an action to be performed relative to a selected portion of an image. The buttons may be selected for display based on an application the user is operating (e.g., if they acquired the image while they had their contacts program operating), by the content of the image (e.g., if faces are identified in the image), or by other factors, such as suggesting that a user make a contact out of an image whenever the image is taken at a certain time (e.g., late at night) or in a certain place (e.g., at a convention or at a bar) as determined, for example using GPS capabilities and geo-data accessible to the mobile device.

In this example, the user is presented with buttons to begin a process of adding portions of the image to contacts records for the user. In the example, the user may select button 104 to indicate that the person currently selected in an image is a new contact, i.e., someone for whom the user does not currently have stored contact information. The user may select button 106 to indicate that the person currently selected in an image is a current contact, i.e., someone for whom the user has contact information but does not have a picture (the user could also already have a picture but may wish to append the newest picture to a record associated with a particular acquaintance).

When the user identifies the image as relating to a new contact, the device may open a blank contact form with the cropped image inserted into the form. Where the user identifies the images as relating to an existing contact, the device may prompt the user in familiar ways to identify the contact, such as by typing the first few letters of the contact's last name so that the device may then display a list of all contacts that match those letters, and the user may then scroll up and down in the list to select the particular appropriate contact.

FIG. 1B illustrates a display 101 that shows a filled-in contact record associated with a cropped portion of an image. The contact information may include, but is not limited to, name, title, home address, home telephone number, work address, work telephone number, fax number, email address, personal email address, Google® Talk identification, birth date, sex, and or user authored notes. The image associated with the contact record may be either static or moving (e.g., a short audio/video clip of the person, with the facial area cropped out). The user may enter the contact information manually, e.g., by typing or writing, may receive the information via a transmission from another user, e.g., over Bluetooth or other appropriate mechanism, or by other mechanisms, such as by receiving an e-mail sent from the other person's device that contains contact information for the user than can be readily transferred by a device into a contact record (e.g., a V Card). In addition, the cropped image and related contact information may then be transmitted or synchronized between the user's mobile device and other devices owned by the user such as a laptop or desktop computer, in standard manners for synchronizing contact information.

FIG. 1C is an exemplary schematic representation of a display 112 in an exemplary contact selection mode. The display 112 provides an illustration of an use that can be made of captured image content that has been associated with a contacts program on a mobile device. In this example, the information is used in a visual phonebook, including contacts' first names and an associated pictures.

The pictures may be based on the cropped image described above. In some instances, a picture may not be available for one or more contacts. In such a situation, the picture associated with a particular contact may include an icon, such as is the case with contacts "Debra" and "Sara" of FIG. 1C. The icon may be received, for instance from a device of the other user, or may be selected by the person operating the display 112. For example, as a help in remembering who Sara and Debra are, the user may have received the impression that Debra was very much like a flower child, and thus selected a peace sign to represent her, and may have observed that Sara was very happy, and thus selected a smiley face to represent her. If no icon is assigned, the picture associated with a particular contact may include a generic silhouette, as is the case with contact "Frank" of FIG. 1C. Pictures may also be obtained via other routes, such as from social networking web sites where members post photos and other information.

In the mode shown in FIG. 1C, the GUI enables a user to scroll through the phonebook images and select a contact based thereon. Once a contact has been selected, the user may have several options including, but not limited to, calling the contact, text messaging (e.g., SMS) the contact, telephony messaging (MMS) the contact, emailing the contact and/or editing the contact information. When a particular contact has been selected, the images of the other contacts may be removed, and information associated with the selected contact displayed instead. For example, the image of the selected contact may be moved to one side of the display, and buttons representing options for actions that may be performed on the device may be displayed.

It may further be provided that the contact image is provided as a three-dimensional (3D) image as opposed to a two-dimensional (2D), or flat, image. More specifically, the cropped image can be mapped onto a 3D model of a human face, for example. The 3D model can be a standard model, can be selected from a plurality of 3D models and/or can be generated based on the cropped image itself. In this manner, the user is provided with a life-like, 3D icon of a contact.

Figure 2A:
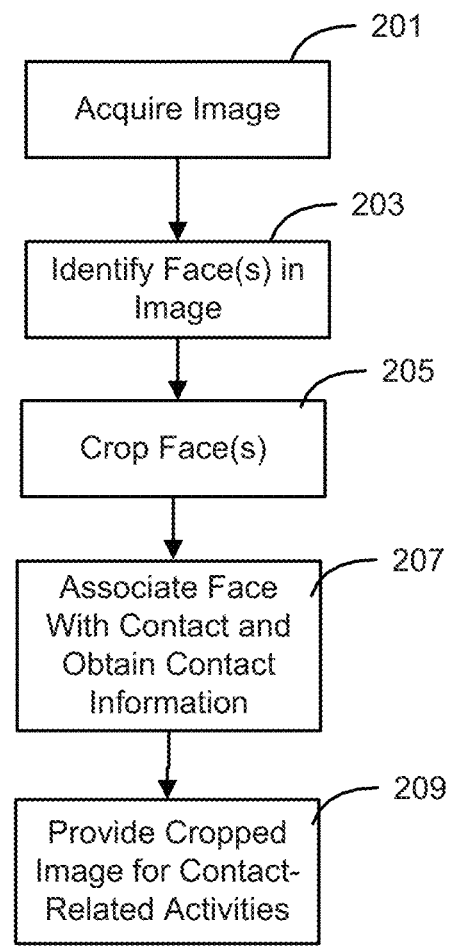
FIG. 2A is a flow chart of a process for associating a portion of an image with contact-related information.

FIG. 2A is a flow chart of a process for associating a portion of an image with contact-related information. At box 201, an image is initially acquired. The acquisition of the image may occur, for example, by the taking of a picture with a digital camera that is part of a mobile device such as a smartphone. At box 203, a face or faces are identified in the images. Such identification may have occurred before the image was acquired, such as part of a camera auto-focus process that identifies faces in order to provide an auto focus point for a device. Or the faces may be identified from an image that has been acquired. The initial identification of the face may be automatic, and in certain implementations, a user of the device may adjust a boundary that makes the identification of the face, by moving the boundary, enlarging or shrinking it, or changing its shape.

The process may then crop the identified faces out of the image, at box 205. Where there are multiple faces, the cropping may occur at once or may be conducted serially. Various approaches for such cropping may be used, such as by forming images that are separate from the main image and displaying the cropped images side-by-side for further manipulation, or by showing them one-by-one. Also, the cropped portions may be left in position on the display while the rest of the image is eliminated around them. In addition, the cropped images may be enlarges or shrunk to fit a standard-sized space, such as a photo frame in a contacts database record. Padding may also be added to the cropped image to make it fit a particular size and shape.

At box 207, the cropped image is associated with contact information in a contacts database, such as a standard contacts application that is part of a personal organizer. The association may occur in a number of manners, such as manual data entry, linking to an existing contact, short-range wireless transmission from a device owned by the subject of the image, long-range transmission such as via e-mail, or access through a website or other mechanism. When multiple images have been identified, a user may associate each image with a different contact in turn.

The cropped image is then provided for contact-related activities at box 209. For example, the image can be displayed when a user of a device pulls up a particular contact record. Also, as shown in FIG. 1C, the image may be displayed with other images in a visual contacts directory. In addition, multiple images of a single contact may be stored, and a system may create a photo album for that contact. Cropped images in the album may be linked back to the base images from which they were cropped, so that a user may browse a visual directory of the cropped images to find one they like, and then may select a particular cropped image to see a full image.

The cropped images may also be transferred to another device, such as a mobile device of another user or to an initial user's laptop or desktop computer. Before or after being transferred, the image may be provided, for example, to a social networking web site, such as to show various people who the particular user has been in contact with.

Figure 2B:
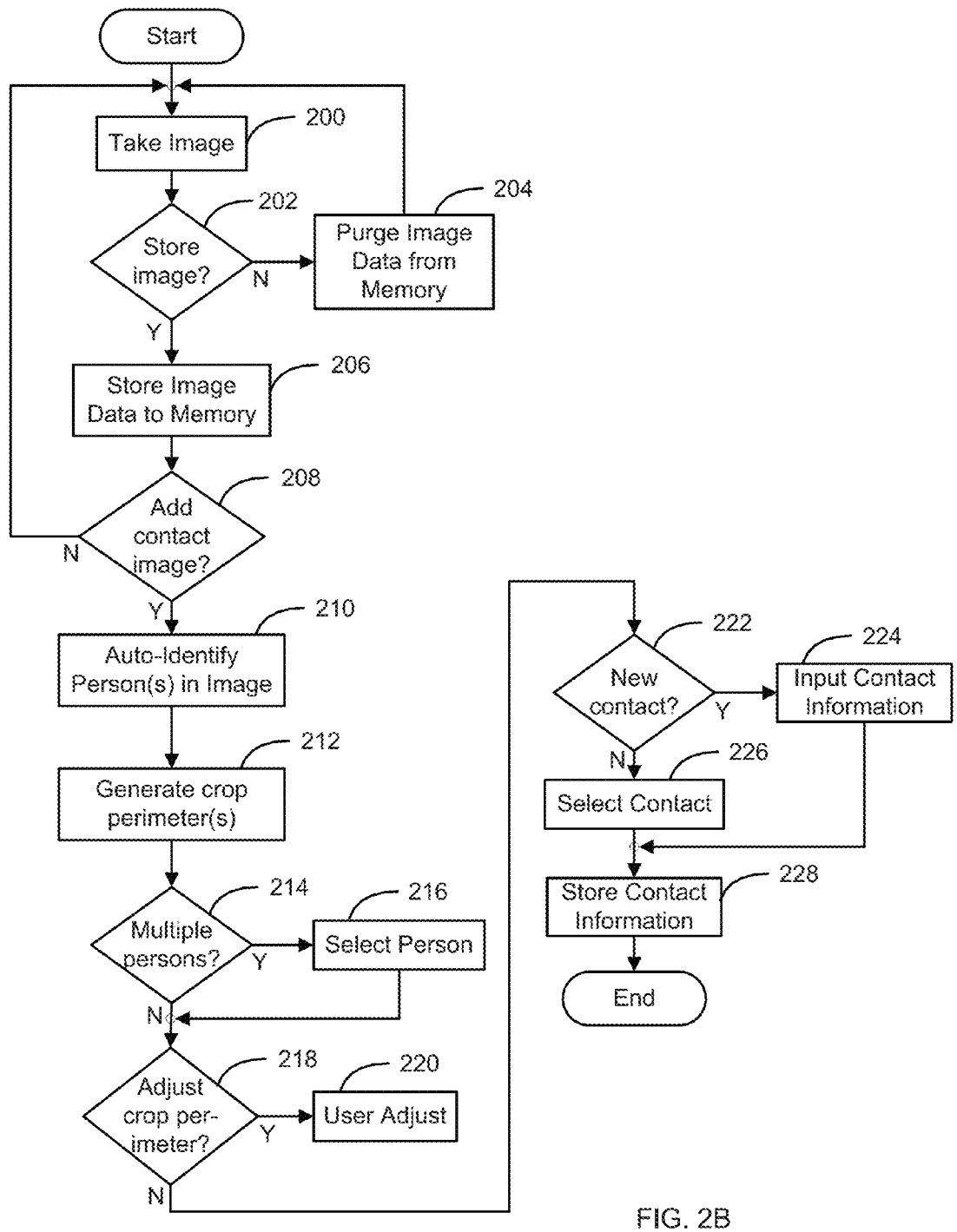
FIG. 2B illustrates exemplary steps that may be executed in an automatic cropping method.

FIG. 2B illustrates exemplary steps that may be executed in an automatic cropping method. The method here is similar to that shown in FIG. 2A, but includes additional details that may be performed in certain implementations. At 200, an image is taken or acquired. At 202, the user is queried as to whether the image should be stored. If the image is not to be stored, the image data is purged at 204. If the image is to be stored, the image data is stored to memory at 206. At 208, the user is queried as to whether a contact image based on the stored image should be added. If no contact image is to be added the embodiment loops back to 200. If a contact image is to be added, a face or faces are auto-identified at 210. At 212, a crop perimeter is generated corresponding to an identified person or persons.

At 214, the automatic cropping determines whether there are multiple persons present in the image. If multiple persons are present, the user selects a particular person at 216. At 218, the user is queried as to whether the crop perimeter is to be adjusted. If the crop perimeter is to be adjusted, the user adjusts the crop perimeter at 220. At 222, the user is queried as to whether the selected person is a new contact. If the selected person is a new contact, the user is prompted for and inputs contact information at 224. If the person is not a new contact, the user is prompted to select a previously stored contact at 226. The contact information is stored at 228.

Referring now to FIG. 3, the exterior appearance of an exemplary device 300 that implements the automatic cropping is illustrated. In more detail, the hardware environment of the device 300 includes a display 301 for displaying text, images, and video to a user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 shows an external antenna 305, the device 300 can include an internal antenna, which is not visible to the user.

The display 301 can display video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that outputs the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications that provide for automatic cropping of images. The keyboard 302 includes standard keyboard buttons or keys associated with alphanumeric characters, such as keys 326 and 327 that are associated with the alphanumeric characters "Q" and "W" when selected alone, or are associated with the characters "*" and "1" when pressed in combination with key 329. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backward navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 307 allows the device 300 to capture digital images, and may be a scanner, a digital still camera, a digital video camera, other digital input device. In one example implementation, the camera 307 is a 3 mega-pixel (MP) camera that utilizes a complementary metal-oxide semiconductor (CMOS).

The microphone 309 allows the device 300 to capture sound, and may be an omni-directional microphone, a unidirectional microphone, a bi-directional microphone, a shotgun microphone, or other type of apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such as a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Figure 4:
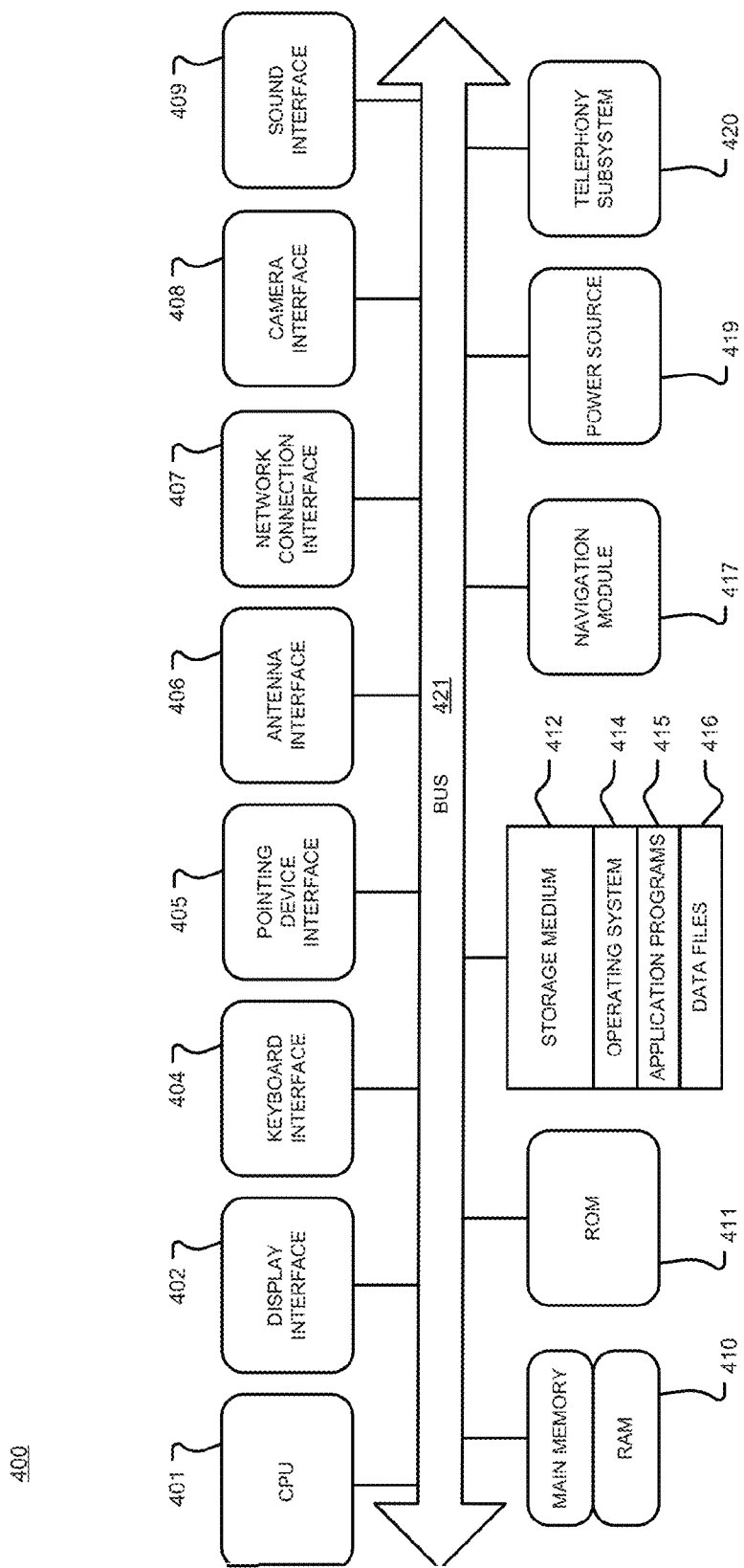
FIG. 4 is a block diagram illustrating the internal architecture of the device of FIG. 3.

FIG. 4 is a block diagram illustrating an internal architecture 400 of the device 300. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface 408 that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 416 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 can be one of a number of computer processors. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some embodiments, the computer program product includes instructions that enables the automatic cropping of images, as described herein.

The operating system 414 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 415 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible to provide for automatic cropping of images using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
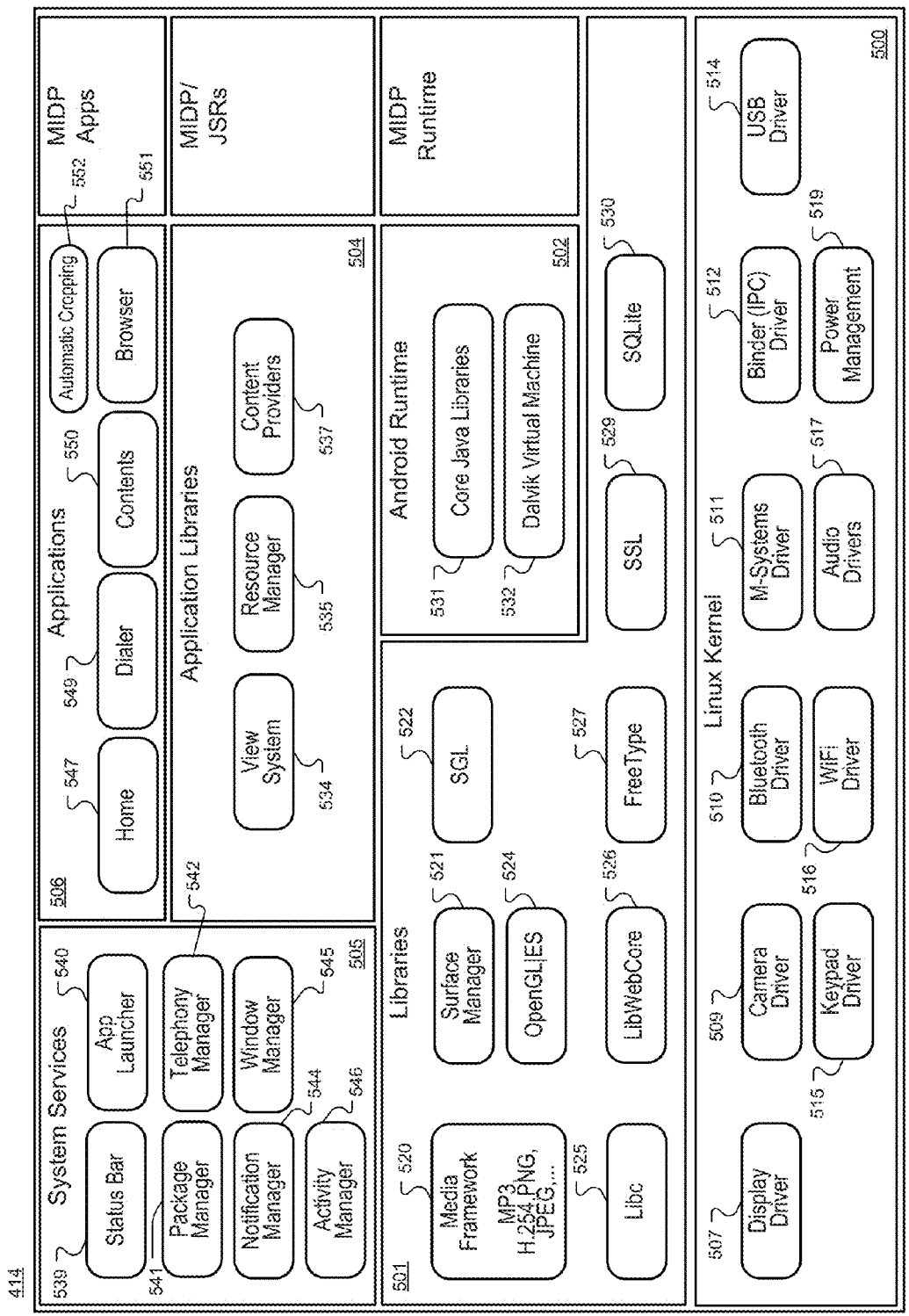
FIG. 5 is a block diagram illustrating exemplary components of the operating system used by the device of FIG. 3.

FIG. 5 is a block diagram illustrating exemplary components of the operating system 414 used by the device 300, in the case where the operating system 414 is the GOOGLE mobile device platform. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 515 to interact with the display 301 via the display interface 402, a camera driver 509 that allows the software to interact with the camera 307; a BLUETOOTH driver 510; a M-Systems driver 511; a binder (IPC) driver 512, a USB driver 514 a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 519.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502 includes core JAVA libraries 531, and a Dalvik virtual machine 532. The Dalvik virtual machine 532 is a custom, virtual machine that runs a customized file format (.DEX).

The operating system 414 can also include Mobile Information Device Profile (MIDP) components such as the MIDP JAVA Specification Requests (JSRs) components, MIDP runtime, and MIDP applications as shown in FIG. 5. The MIDP components can support MIDP applications running on the device 300.

With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 504 include a view system 534, a resource manager 535, and content providers 537. The system services 505 includes a status bar 539; an application launcher 540; a package manager 541 that maintains information for all installed applications; a telephony manager 542 that provides an application level JAVA interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506 include a home application 547, a dialer application 549, a contacts application 550, a browser application 551, and automatic cropping application 552.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
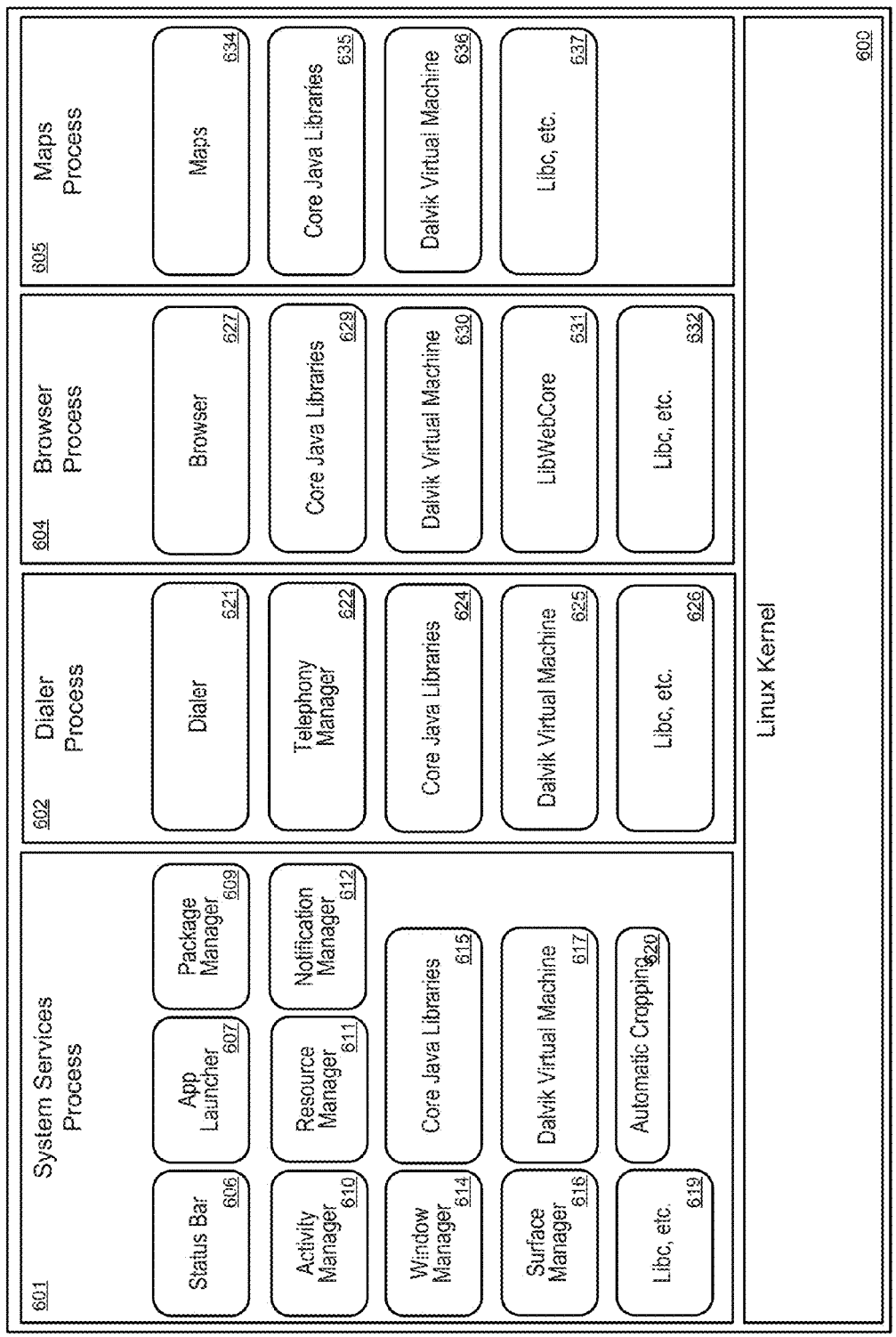
FIG. 6 is a block diagram illustrating exemplary processes implemented by the operating system kernel of FIG. 5.

FIG. 6 is a block diagram illustrating exemplary processes implemented by the operating system kernel 600. Generally, applications and system services run in separate processes, where the activity manager 546 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 616, the window manager 614, or the activity manager 610 can be continuously executed while the device 300 is powered. Additionally, some application-specific process can also be persistent. For example, processes associated with the dialer application 621, may also be persistent.

The processes implemented by the operating system kernel 600 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager 611 that provides access to graphics, localized strings, and XML layout descriptions; notification manger processes 612 associated with the notification manager 544; window manager processes 614 associated with the window manager 545; core JAVA libraries processes 615 associated with the core JAVA libraries 531; surface manager processes 616 associated with the surface manager 521; Dalvik virtual machine processes 617 associated with the Dalvik virtual machine 532, LIBC processes 619 associated with the LIBC library 525; and automatic cropping processes 620 associated with the automatic cropping application 552.

The dialer processes 602 include dialer application processes 621 associated with the dialer application 549; telephony manager processes 622 associated with the telephony manager 542; core JAVA libraries processes 624 associated with the core JAVA libraries 531; Dalvik virtual machine processes 625 associated with the Dalvik Virtual machine 532; and LIBC processes 626 associated with the LIBC library 525. The browser processes 604 include browser application processes 627 associated with the browser application 551; core JAVA libraries processes 629 associated with the core JAVA libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

The maps processes 605 include maps application processes 634, core JAVA libraries processes 635, Dalvik virtual machine processes 636, and LIBC processes 637. Notably, some processes, such as the Dalvik virtual machine processes, may exist within one or more of the systems services processes 601, the dialer processes 602, the browser processes 604, and the maps processes 605.

Figure 7:
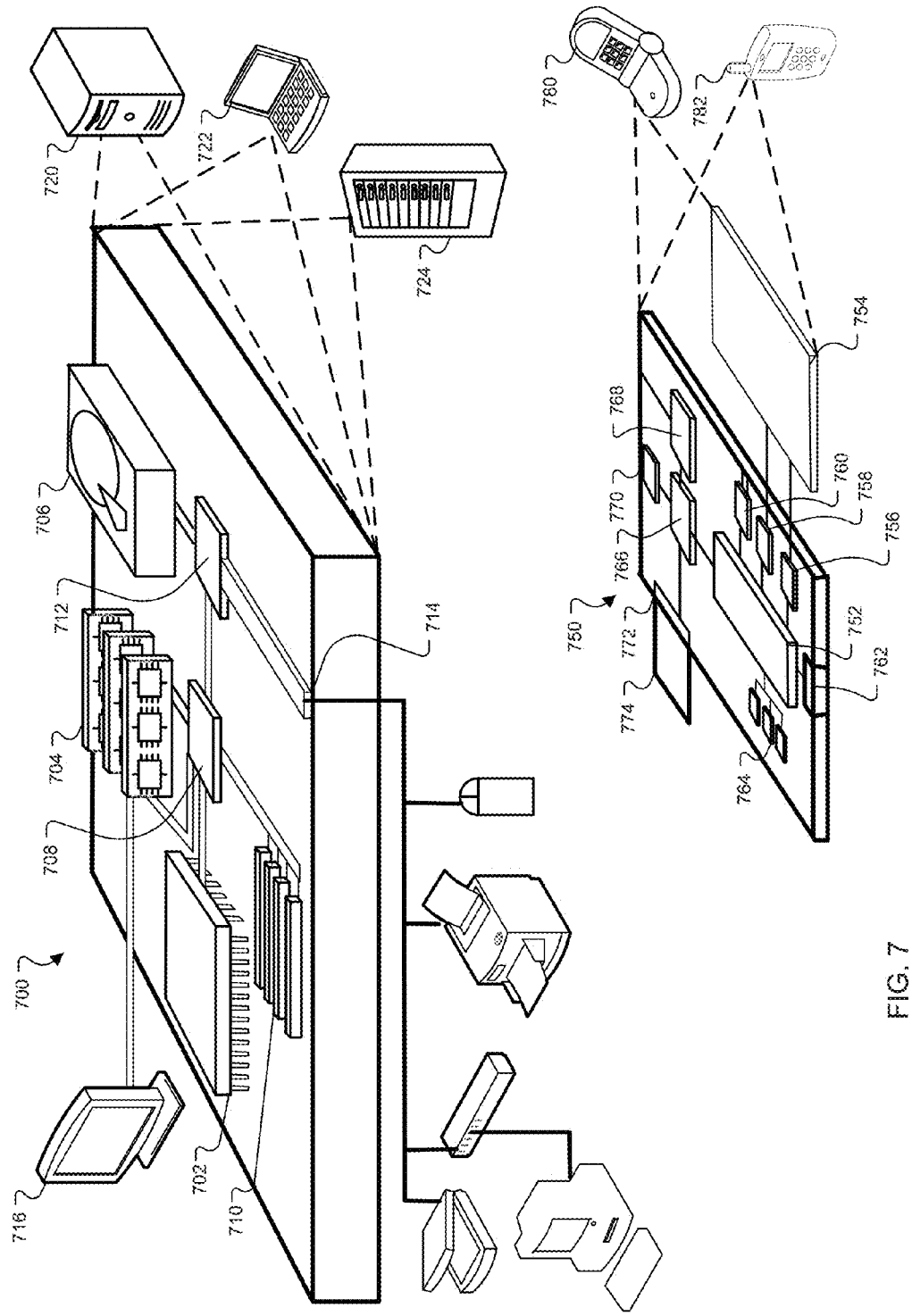
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the automatic and manual cropping of pictures have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
displaying, by a computing device, a first image;
receiving, based on user input, a request to generate a contact image from the first image;
identifying one or more features of a person in the first image;
cropping the first image to generate the contact image, the contact image including the one or more features of the person in the first image;
mapping the contact image to a particular contact record from among a plurality of contact records associated with a user of the computing device; and
displaying, based on the mapping, the contact image and a representation of the particular contact record.

2. The computer-implemented method of claim 1, wherein the user input is first user input, further comprising:
receiving, based on second user input, selection of the particular contact record, wherein the particular contact record is selected from among the plurality of contact records to be mapped to the contact image as a result of the selection of the particular contact record from the second user input.

3. The computer-implemented method of claim 1, wherein the user input is first user input, further comprising:
outputting, for display, a prompt that queries whether the contact image should be generated, wherein the request to generate the contact image from the first image is received as second user input that is responsive to the prompt.

4. The computer-implemented method of claim 1, wherein mapping the contact image to the particular contact record comprises substituting a previous mapping of another contact image to the particular contact record with a new mapping of the contact image to the particular contact record.

5. The computer-implemented method of claim 1, wherein the particular contact record is not associated with any contact image before the request to generate the contact image from the first image is received.

6. The computer-implemented method of claim 1, wherein the particular contact record includes identifying information for the person in the image and at least one of a phone number and an e-mail address associated with the person in the image.

7. The computer-implemented method of claim 1, wherein identifying the one or more features of the person in the image comprises identifying one or more jets from a representation of the image that correspond to the features, wherein the jets are comprised of wavelet transforms.

8. The computer-implemented method of claim 1, wherein identifying the one or more features of the person in the image comprises identifying a face of the person in the image, wherein the one or more features of the person include the face of the person.

9. The computer-implemented method of claim 1, further comprising identifying that multiple persons are presented in the image,
wherein identifying the one or more features of the person in the image comprises identifying the person from among the multiple persons presented in the image.

10. The computer-implemented method of claim 9, further comprising receiving an indication that user input selected the person in the image, wherein the person is identified from among the multiple persons presented in the image in response to receiving the indication that user input selected the person.

11. The computer-implemented method of claim 1, wherein cropping the first image to generate the contact image comprises:
(i) identifying a crop perimeter that encompasses the one or more features of the person in the image, and
(ii) generating the contact image so as to include in the contact image a first portion of the first image that is located within the crop perimeter to the exclusion of a second portion of the first image that is located outside of the crop perimeter.

12. The computer-implemented method of claim 11, wherein the crop perimeter is automatically determined.

13. The computer-implemented method of claim 11, wherein identifying the crop perimeter comprises:
automatically generating an initial crop perimeter; and
adjusting the initial crop perimeter based on user input that selects to change at least one of a size and a location of the initial crop perimeter.

14. The computer implemented method of claim 1, further comprising, for each of multiple persons in the image, defining a crop perimeter for the respective person that encompasses one or more features that are determined to correspond to the respective person.

15. The computer-implemented method of claim 1, wherein (i) identifying the one or more features of the person in the first image, and (ii) cropping the first image to generate the contact image, are automatically performed in response to receiving the request to generate the contact image.

16. The computer-implemented method of claim 15, wherein mapping the contact image to the particular contact record is further performed in response to receiving the request to generate the contact image.

17. One or more non-transitory computer-readable media having instructions stored thereon that, when executed by one or more processors, cause performance of operations comprising:
    displaying, by a computing device, a first image;
    receiving, based on user input, a request to generate a contact image from the first image;
    identifying one or more features of a person in the first image;
    cropping the first image to generate the contact image, the contact image including the one or more features of the person in the first image;
    mapping the contact image to a particular contact record from among a plurality of contact records associated with a user of the computing device; and
    displaying, based on the mapping, the contact image and a representation of the particular contact record.

18. The one or more non-transitory computer-readable media of claim 17, wherein:
    the user input is first user input,
    the operations further comprise receiving, based on second user input, selection of the particular contact record, and
    the particular contact record is selected from among the plurality of contact records to be mapped to the contact image as a result of the selection of the particular contact record from the second user input.

19. The one or more non-transitory computer-readable media of claim 17, wherein the user input is first user input, wherein the operations further comprise:
    outputting, for display, a prompt that queries whether the contact image should be generated, wherein the request to generate the contact image from the first image is received as second user input that is responsive to the prompt.

20. The one or more non-transitory computer-readable media of claim 17, wherein mapping the contact image to the particular contact record comprises substituting a previous mapping of another contact image to the particular contact record with a new mapping of the contact image to the particular contact record.

* * * * *